BEST AVAILABLE COPY

DEFENSIVE PUBLICATION T856,036

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 19, 1968

856 O.G. 670

T856,036 204-181

733,814

ELECTRODEPOSITION OF PAINT ON INNER SURFACES OF CONDUCTIVE ENCLOSURES

George E. F. Brewer, Novi, and Gilbert L. Burnside and Gordon G. Strosberg, Oak Park, Mich., assignors to Ford Motor Company, Dearborn, Mich., a corporation of Delaware Filed June 3, 1968. Published Nov. 19, 1968
Class 204—181
No Drawing. 10 Pages Specification An improved method for electrodepositing paint inside a substantially enclosed compartment is enhanced by control of perimeter-to-area ratio of apertures therein. When paint is electrodeposited upon an electrode immersed in the bath of an electrodeposition cell, the most difficult surfaces to coat are those electrically shielded from the opposing electrode. When the degree of shielding is sufficiently great to require the positioning of supplementary apertures to permit full coating, the area and depth of deposit upon the surrounding inner surfaces is increased by employing elongated, slit-like apertures having a high perimeter-to-area ratio, advantageously between about 12 and 50, preferably between about 15 and 25. The minimum width of the aperture is advantageously not substantially below about 0.05 inch, preferably not substantially below about 0.10 inch.